US010264085B2

United States Patent
Liu et al.

(10) Patent No.: US 10,264,085 B2
(45) Date of Patent: Apr. 16, 2019

(54) METHOD AND DEVICE FOR PRESENTING PUSH NOTIFICATIONS

(71) Applicant: Xiaomi Inc., Beijing (CN)

(72) Inventors: Meilan Liu, Beijing (CN); Ziguang Gao, Beijing (CN); Enxing Hou, Beijing (CN)

(73) Assignee: XIAOMI INC., Haidian District, Beijing ( * ) Notice: Subject to any disclaimer, the term of this patent is extended or adjusted under 35 U.S.C. 154(b) by 527 days.

(21) Appl. No.: 15/081,958

(22) Filed: Mar. 28, 2016

(65) Prior Publication Data

US 2017/0126826 A1   May 4, 2017

(30) Foreign Application Priority Data

Oct. 29, 2015   (CN) .......................... 2015 1 0717548

(51) Int. Cl.
| | |
|---|---|
| *G06F 3/0483* | (2013.01) |
| *H04L 29/08* | (2006.01) |
| *H04M 1/725* | (2006.01) |
| *H04M 19/04* | (2006.01) |
| *G06F 3/01* | (2006.01) |

(Continued)

(52) U.S. Cl.
CPC .............. *H04L 67/26* (2013.01); *G06F 3/016* (2013.01); *G06F 3/0481* (2013.01); *G06F 3/16* (2013.01); *H04M 1/72552* (2013.01); *H04M 19/045* (2013.01)

(58) Field of Classification Search
CPC ....... H04L 67/26; G06F 3/016; G06F 3/0481; G06F 3/16; H04M 1/72552; H04M 19/045

USPC .......................................................... 715/710
See application file for complete search history.

(56) References Cited

U.S. PATENT DOCUMENTS

| | | | |
|---|---|---|---|
| 6,400,810 B1 * | 6/2002 | Skladman | H04L 51/12 |
| | | | 379/93.24 |
| 6,763,384 B1 | 7/2004 | Gupta et al. | |
| 8,731,523 B1 | 5/2014 | Onnen et al. | |

(Continued)

FOREIGN PATENT DOCUMENTS

| | | |
|---|---|---|
| CN | 101262497 A | 9/2008 |
| CN | 101309324 A | 11/2008 |

(Continued)

OTHER PUBLICATIONS

Office Action for RU Application No. 2016107977 dated Jul. 13, 2017.

(Continued)

*Primary Examiner* — David Phantana-angkool
(74) *Attorney, Agent, or Firm* — Jun He Law Offices P.C.; James J. Zhu

(57) ABSTRACT

A method for presenting push notifications in a terminal device configured with a notification bar may include: determining, when a push notification is received, whether the notification bar contains a target push notification, the target push notification being a previously received message with a message content as same as that of the currently received push notification; updating a push time of the target push notification to the push time of the currently received push notification in response to determining that the notification bar has contained the target push notification; and presenting the updated push time of the target push notification in the notification bar.

13 Claims, 7 Drawing Sheets

(51) Int. Cl.
*G06F 3/0481* (2013.01)
*G06F 3/16* (2006.01)

(56) References Cited

U.S. PATENT DOCUMENTS

| | | | | |
|---|---|---|---|---|
| 9,230,241 | B1* | 1/2016 | Singh | G06F 3/00 |
| 9,417,759 | B1* | 8/2016 | Srinivasan | G06F 17/30899 |
| 2003/0200207 | A1 | 10/2003 | Dickinson | |
| 2008/0220752 | A1* | 9/2008 | Forstall | H04M 1/56 |
| | | | | 455/415 |
| 2013/0084896 | A1* | 4/2013 | Barkie | H04W 12/02 |
| | | | | 455/466 |
| 2013/0346521 | A1* | 12/2013 | Arabo | H04L 29/08693 |
| | | | | 709/206 |
| 2014/0335827 | A1* | 11/2014 | Tsuda | H04M 1/67 |
| | | | | 455/411 |
| 2015/0193522 | A1 | 7/2015 | Choi et al. | |
| 2017/0126826 | A1* | 5/2017 | Liu | H04M 1/72552 |
| 2017/0150290 | A1* | 5/2017 | Gao | G06F 9/4843 |
| 2018/0107743 | A1* | 4/2018 | Taboriskiy | G06Q 50/01 |
| 2018/0183651 | A1* | 6/2018 | Liu | H04L 29/08 |
| 2018/0270180 | A1* | 9/2018 | Chen | G06F 3/0481 |
| 2018/0284981 | A1* | 10/2018 | Lu | G06F 3/0481 |
| 2018/0288211 | A1* | 10/2018 | Kim | H04M 1/72552 |
| 2018/0295200 | A1* | 10/2018 | Zhang | H04L 67/26 |

FOREIGN PATENT DOCUMENTS

| | | |
|---|---|---|
| CN | 101540740 A | 9/2009 |
| CN | 103167434 A | 6/2013 |
| CN | 103227868 A | 7/2013 |
| CN | 103501340 A | 1/2014 |
| CN | 103873688 A | 6/2014 |
| CN | 103955474 A | 7/2014 |
| CN | 104104591 A | 10/2014 |
| JP | 2006072755 A | 3/2006 |
| JP | 2007174299 A | 7/2007 |
| JP | 2008-035386 A | 2/2008 |
| JP | 2008-217731 A | 9/2008 |
| JP | 2009188987 A | 8/2009 |
| JP | 2009194635 A | 8/2009 |
| JP | 2010249580 A | 11/2010 |
| JP | 2012213243 A | 11/2012 |
| JP | 2015005818 A | 1/2015 |
| KR | 100677497 B1 | 1/2007 |
| KR | 20140038238 A | 3/2014 |
| KR | 101531209 B1 | 6/2015 |
| RU | 2009148134 A | 6/2011 |

OTHER PUBLICATIONS

Extended European Search Report of EP16158290.3.
International Search Report of PCT/CN2015/099302.
Office Action of Korea Application No. 10-2016-7005541.
The Office Action on Japanese patent application No. 2017-547049, dated Jun. 26, 2018.
Office Action in Chinese application No. 201510717548.2, dated Oct. 19, 2018.

* cited by examiner

METHOD AND DEVICE FOR PRESENTING PUSH NOTIFICATIONS

CROSS-REFERENCE TO RELATED APPLICATIONS

This application claims priority to Chinese Patent Application No. 201510717548.2, filed Oct. 29, 2015, which is incorporated herein by reference in its entirety.

FIELD

The present disclosure generally relates to the field of information technology, and more particularly to method, device and computer-readable medium for presenting push notifications.

BACKGROUND

With the increasing development of technology, types and numbers of smart terminals are increasing continuously. Smart devices, such as smart bulbs, smart cameras, smart air cleaners and smart purifying curtains in addition to smart telephones usually used by a user, generally can be bound to a smart telephone of the user and push notifications to the smart telephone.

However, the message content of the push notifications sent by the other smart device to the smart telephone is the same most of time. If the smart device pushes notifications to the smart telephone too frequently, the user may be disturbed by vibration or prompt sound generated when the notification is received by the smart telephone. As a result, normal life and work of the user may be affected a lot.

SUMMARY

Accordingly, a method, device and computer-readable medium for presenting push notifications are provided in the present disclosure.

According to a first aspect of the present disclosure, a method for presenting push notifications in a terminal device configured with a notification bar is provided, including: determining, when a push notification is received, whether the notification bar contains a target push notification, the target push notification being a previously received message with a message content as same as that of the currently received push notification; updating a push time of the target push notification to the push time of the currently received push notification in response to determining that the notification bar has contained the target push notification; and presenting the updated push time of the target push notification in the notification bar.

According to a second aspect of the present disclosure, a terminal device is provided, including: a processor; a memory for storing instructions executable by the processor; wherein the processor is configured to: determine, when a push notification is received, whether a notification bar of the terminal device contains a target push notification, the target push notification being a previously received message with a message content as same as that of the currently received push notification; update a push time of the target push notification to the push time of the currently received push notification in response to determining that the notification bar has contained the target push notification; and present the updated push time of the target push notification in the notification bar.

According to a third aspect of the present disclosure, a non-transitory computer readable storage medium having stored therein instructions that, when executed by a processor of a terminal device configured with a notification bar, cause the device to: determine, when a push notification is received, whether a notification bar of the terminal device contains a target push notification, the target push notification being a previously received message with a message content as same as that of the currently received push notification; update a push time of the target push notification to the push time of the currently received push notification in response to determining that the notification bar has contained the target push notification; and present the updated push time of the target push notification in the notification bar.

It is to be understood that both the forgoing general description and the following detailed description are exemplary only, and will not limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Exemplary embodiments are described in detail herein, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

Figure 1:
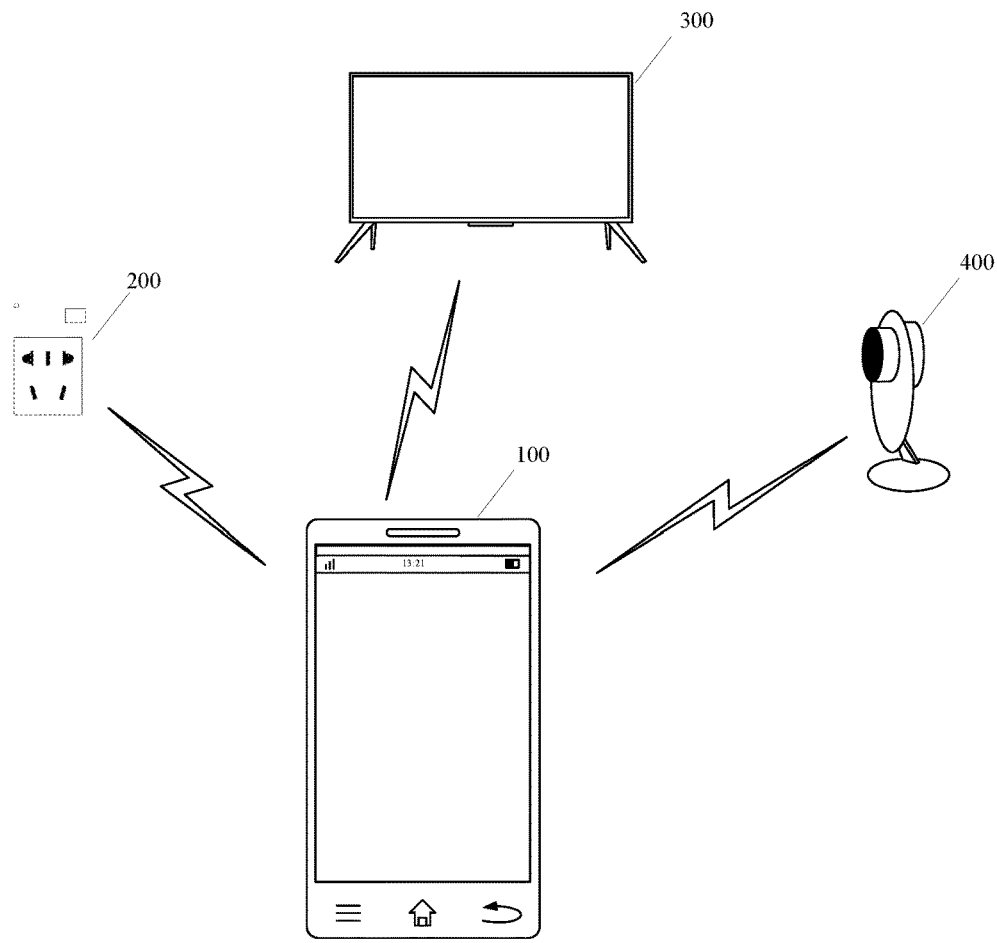
FIG. 1 is a schematic diagram illustrating an exemplary application scenario according to an embodiment.

FIG. 1 is a schematic diagram illustrating an exemplary application scenario according to an exemplary embodiment. In FIG. 1, the application scenario may include a smart telephone 100, a smart socket 200, a smart TV 300 and a smart camera 400. The smart telephone 100 may communicate with the smart socket 200, the smart TV 300 and the smart camera 400 respectively and the communication may be made via Bluetooth, Infrared or wireless networks, and the like.

The smart socket 200, the smart TV 300 and the smart camera 400 may generate push notifications on their operating state or detected data and send the push notifications to the smart telephone 100. A user may be aware of the operating state of the smart terminals bound to the smart telephone 100 by viewing the push notification received by the smart telephone 100 to take effective actions.

For example, when the smart socket 200 detects that a power consumption of an electrical appliance connected with the smart socket 200 exceeds a rated power, it will send push notification to the smart telephone 100 to prompt the user to decrease the power consumption of the corresponding electrical appliance or turn off the corresponding electrical appliance to avoid harmful cases such as burning up the electrical appliance. As another example, when the smart camera 400 detects a movement of somebody, it will also send push notification to the smart telephone 100 to enable the user to take actions to avoid the cases such as burglary and the like.

However, when the smart telephone 100 receives the push notification sent by a smart device bound thereto frequently, the user will be disturbed by the prompt generated by the push notification that is received by the smart telephone 100, and this will affect the user's normal work and life. If the user turns off the prompt generated when the push notification is received by the smart telephone 100, it is possible for the user to miss important information and the user may suffer a loss.

In the methods for presenting push notifications provided in the present disclosure, when the smart telephone 100 receives a push notification sent by a smart device, it will determine whether there is a target push notification in a notification bar. Herein the target push notification is a previously received message with a message content as same as that of the currently received push notification. When there is the target push notification in the notification bar, the smart telephone 100 will update a push time of the target push notification. There is no need for the smart telephone 100 to generate a prompt such as by ringing and/or vibration, thereby avoiding the user being disturbed due to the prompt generated by the smart telephone 100.

Additionally, further determination may be made regarding times of reception of repeated push notifications received by the smart telephone 100 and the level of importance of the currently received push notification to determine whether to present a prompt for the currently received push notification. Reference may be made to detailed illustration below which will not be repeated herein.

Figure 2:
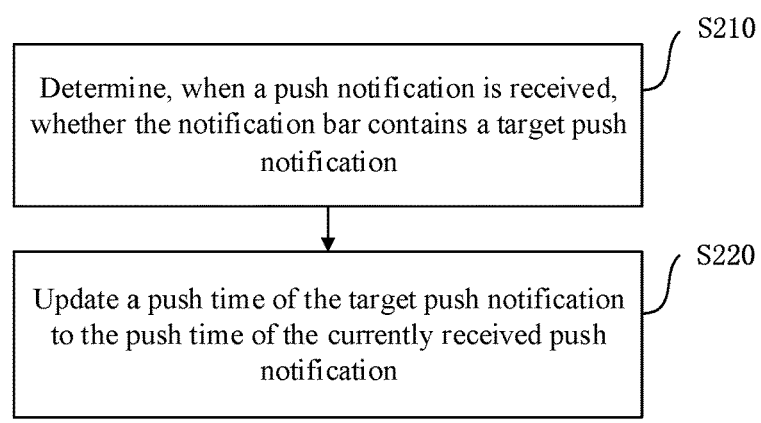
FIG. 2 is a flow diagram illustrating a method for presenting push notifications according to an exemplary embodiment.

For detailed illustration of the above operation flow, a method for presenting push notifications is provided in the present disclosure. As shown in FIG. 2, the method may include the following steps.

In step S210, when push notification is received, whether the notification bar contains a target push notification is determined. The target push notification is a previously received message with a message content as same as that of the currently received push notification.

Based on the above embodiment in FIG. 1, a smart telephone is a kind of terminal device which may bind to a plurality of variety of smart devices and may receive push notifications sent by the smart devices. When the terminal device receives a push notification sent by the smart devices, the terminal device will acquire time of receiving the push notification. The time of receiving the push notification is referred as a push time of the push notification and may be a specific instance of time including year, month, day and hour, minute and second, etc. in accordance with actual requirement.

The target push notification refers to notification preexisted in the notification bar. The push notification currently received by the terminal device may be compared with the target push notification to determine whether respective message content of them is identical.

In step S220, the push time of the target push notification in the notification bar is updated to the push time of the currently received push notification in response to determining that the notification bar has contained the target push notification.

If the notification bar has contained the target push notification with the same content as that of the push notification, it may be indicated that the terminal device has received the target push notification with the same content before receiving the new push notification. Accordingly, the user may have received prompt information for the target push notification when receiving previous target push notification. To prevent the user from being prompted and disturbed upon receiving the push notification which would affect the user's normal work and life, only the time of receiving the push notification is updated in the terminal device to facilitate the user's view.

The target push notification and the push notification both correspond to the same application program, that is, the target push notification and the push notification are both pushed by the same application program of the terminal device. For example, when the terminal device receives push notification pushed by another terminal device, the push notification may be processed by an application program which is responsible for another terminal device and the push notification may be pushed to the notification bar of the terminal device.

It should be noted that, the above currently received push notification and target push notification are sent by the same smart device binding to the terminal device. For any two push notification sent by different smart devices, even the message content of the two push notification is identical, a prompt will be generated in the terminal device for each piece of push notification to prompt the user to view.

In the method for presenting push notifications provided in the disclosure, it is avoided that the terminal device always prompt the user when the same device sends push notification with same message content to the terminal device repeatedly within a same period of time, which may affect the user's normal work and life.

Figure 3:
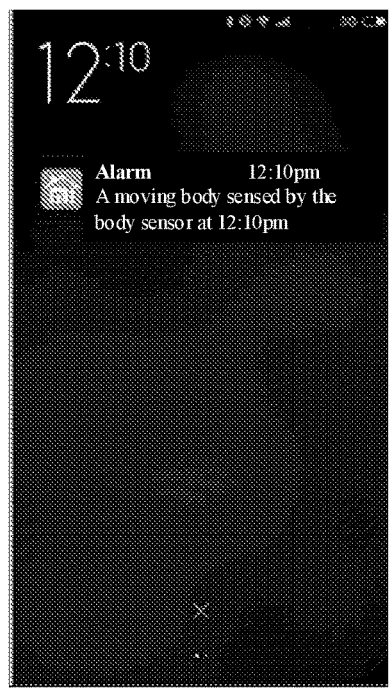
FIG. 3 is a schematic diagram illustrating an application scenario according to an exemplary embodiment.

The content in the push notification and the target push notification may include device identification of the smart terminal, information type and message content of the push notification and the time of receiving the push notification. Exemplarily, as shown in FIG. 3, the currently received push notification and the target push notification may be as follows: Alarm received at 12:10 pm: moving body sensed by the body sensor.

Figure 4:
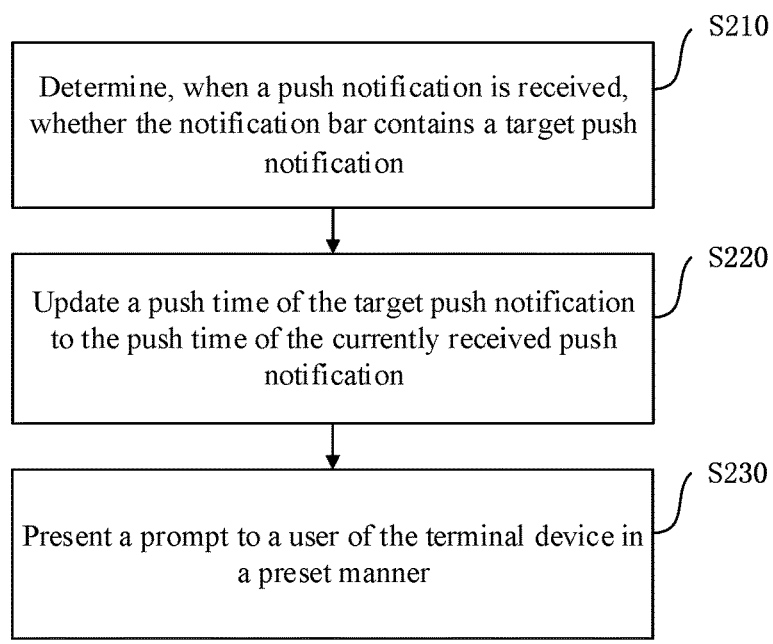
FIG. 4 is a flow diagram illustrating a method for presenting push notifications according to an exemplary embodiment.

In order to more accurately illustrate whether there is a need to prompt for the received push notification, as a refining of the method of FIG. 2, in another exemplary embodiment of the present disclosure, as shown in FIG. 4, the method may further include the following steps.

In step S230, the terminal device may judge whether the push time of the target push notification has been updated more than a preset number of times. Then a prompt is presented in a preset manner when the push time of the target push notification in the notification bar has been updated more than the preset number of times.

The times of reception may be one time, two times, and the like which can be determined as appropriate. If the times of reception are greater than or equal to a preset value, it is possible to indicate that the push notification is urgent communication information and it is needed to be processed by the user instantly, thus it is needed to prompt the push notification. Furthermore, to avoid the case that the user has missed the prompt sent by the terminal device when the terminal device received the push notification the first time within a preset period of time, a prompt will be presented again when repeated push notifications sent from the same smart device are received the second time to avoid missing significant information and causing massive loss for the user.

Figure 5:
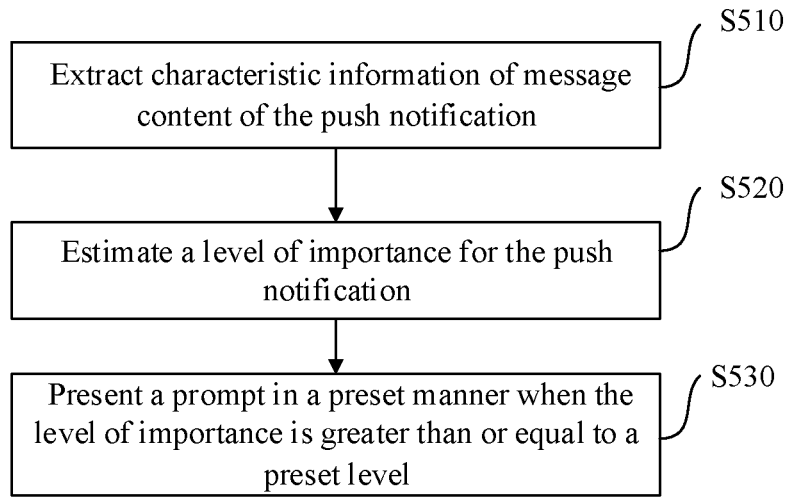
FIG. 5 is a flow diagram illustrating a method for presenting push notifications according to an exemplary embodiment.

In order to more accurately illustrate whether there is a need to prompt for the received push notification, as a refining of the method of FIG. 2, in yet another exemplary embodiment of the present disclosure, as shown in FIG. 5, the method may further include the following steps.

In step S510, characteristic information of the message content of the push notification is extracted.

The characteristic information may be key words of the push notification, such as alarm, urgent, attention and other sensitive words.

In step S520, a level of importance for the push notification is estimated based on the characteristic information.

Exemplarily, if the message content of the push notification includes "alarm, urgent, attention" and other sensitive words, the push notification may be determined to be of higher level of importance. If no sensitive word is included, the push notification may be determined to be of lower level of importance.

In step S530, a prompt is presented in a preset manner when the level of importance is greater than or equal to a preset level.

If the level of importance of the push notification is greater than or equal to the preset level, it may be indicated that the push notification is very important and a timely prompt to be presented for the push notification is needed, such that the user can take corresponding actions quickly when viewing the push notification based on the prompt to avoid loss.

Figure 6:
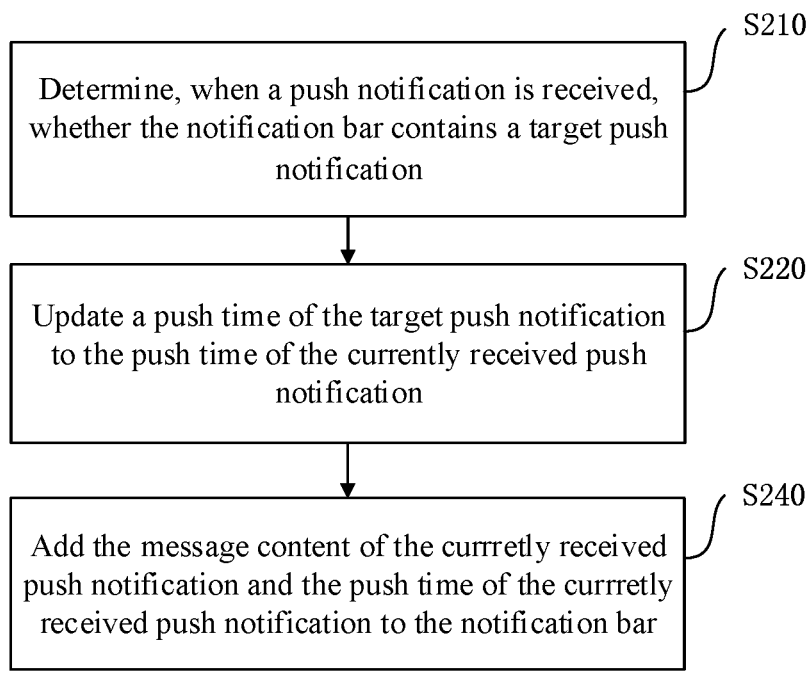
FIG. 6 is a flow diagram illustrating a method for presenting push notifications according to an exemplary embodiment.

As a refining of the method of FIG. 2, in another exemplary embodiment of the present disclosure, as shown in FIG. 6, the method may further include the following steps.

In step S240, the message content of the push notification and the push time of the push notification are added to the notification bar if the target push notification is not included in the notification bar.

For example, if the terminal device of the user has received the push notification previously and the push notification is not presented in the notification bar after the user has viewed it, the message content of the push notification and corresponding push time are needed to be added to the notification bar for convenience of viewing by the user. In another example, if the terminal device receives the push notification the first time and there is no target push notification with the same content as that of the push notification, then the message content of the push notification and corresponding push time are needed to be added to the notification bar for convenience of viewing by the user.

The above method for presenting a prompt for the push notification may be performed in the following manners.

Preset audio may be played by a speaker of the terminal device. For example, rings to which the user is sensitive may be set to be the preset audio to play to prompt the user to view timely. Alternatively, vibration may be generated by the terminal device. Alternatively, a pop-up box may be displayed on the main interface of the terminal device. As such, when viewing or using the terminal device, the user can acquire the push notification timely.

Two or three of the above manners may be combined to quickly and effectively prompt the user.

Figure 7:
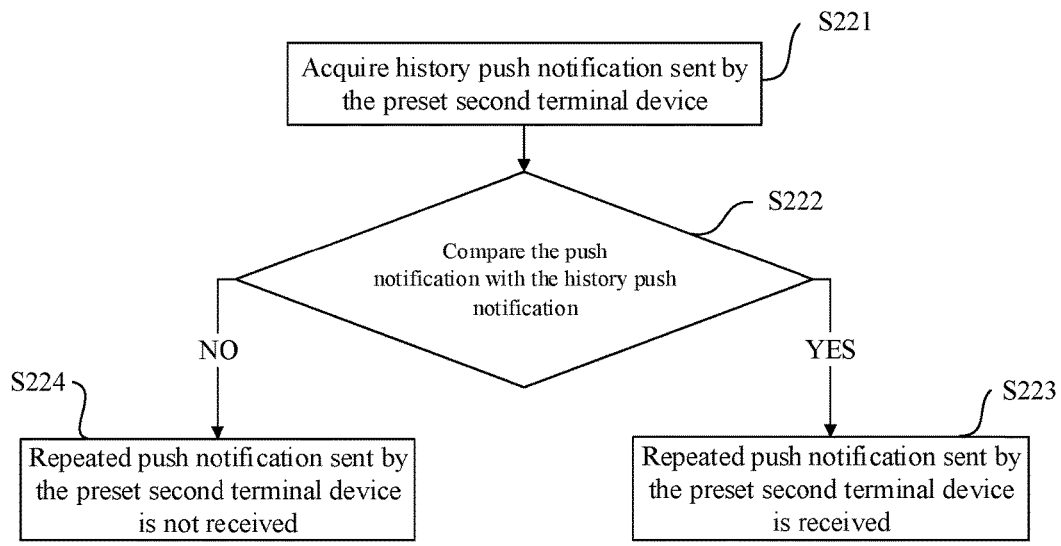
FIG. 7 is a flow diagram illustrating a method for presenting push notifications according to an exemplary embodiment.

In order to more accurately determine whether the terminal device receives a repeated push notification sent by a preset second terminal device, as a refining of the method of FIG. 2, in another exemplary embodiment of the present disclosure, as shown in FIG. 7, the method may further include the following steps.

In step S221, at least one history push notification sent by the preset second terminal device is acquired.

In step S222, the push notification is compared with the at least one history push notification to determine whether the push notification is included in the at least one history push notification.

The push notification may be compared with the at least one history push notification either in a complete match manner or in a semantic match manner.

When the push notification is included in the at least one history push notification, in step S223, it is determined that a repeated push notification sent by the preset second terminal device is received.

When the push notification is not included in the at least one history push notification, in step S224, it is determined that a repeated push notification sent by the preset second terminal device is not received.

It should be noted that, the at least one history push notification may include all the push notification previously sent by the preset terminal device within a preset period of time and previously received by the terminal device. The push notification currently received by the terminal device is compared with the at least one history push notification, it can be determined whether the push notification is included in the at least one history push notification, thus a determination may be made regarding whether the terminal device receives repeated push notification sent by the preset terminal device.

In the method for presenting push notifications provided in the disclosure, the push notification will be compared with the target push notification in the notification bar when the terminal device receive the push notification sent by a binding device or when an application program pushes received information as a push notification. If there is the target push notification with the same content as that of the push notification, the push time corresponding to the target push notification in the notification bar is required to be updated to the push time of the push notification for convenience of viewing of the user, without prompting the user at this point and avoiding the user's normal life and work being disturbed.

Furthermore, in the method for presenting push notifications provided in the disclosure, further determination may be made regarding whether it is needed to prompt the user based on times of reception of repeated push notification and the level of importance of the push notification, thus unnecessary disturbance to the user's work and life can be avoided.

Based on the description of the above method embodiments, those skilled in the art may understand that the disclosure may be implemented by a combination of software and necessary general purpose hardware platform or by hardware only, however, the former one is better in many situations. Based on such understanding, the technical solutions in the present disclosure essentially may be embodied in a software product, for example. The computer software product may be stored in a storage media and may include instructions to enable a computer device, such as a personal computer, a server, a network device, and the like, to perform all or parts of steps of the methods in the present disclosure. The storage media may include a read-only memory (ROM), a random-access memory (RAM), a magnetic or optical disk and other medium capable of storing program codes.

As an implementation of the above embodiments, the present disclosure also provides a device for presenting push notifications. The device is located in a terminal device as shown in FIG. 8, and may include a determination module 10 and an update module 20.

The determination module 10 may be configured to determine, when push notification is received, whether the notification bar contains a target push notification is determined. The target push notification is a previously received message with a message content as same as that of the currently received push notification.

The update module 20 is configured to update the push time corresponding to the target push notification in the notification bar to the push time of the push notification when the determination module 10 determines that there is the target push notification in the notification bar.

Figure 8:
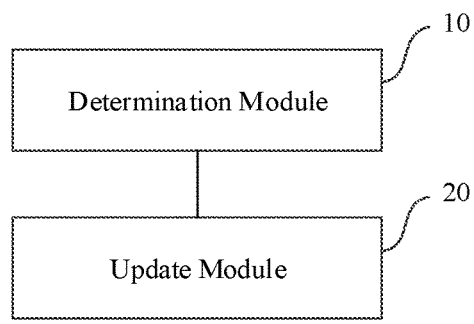
FIG. 8 is a schematic diagram illustrating a device for presenting push notifications according to an exemplary embodiment.
Figure 9:
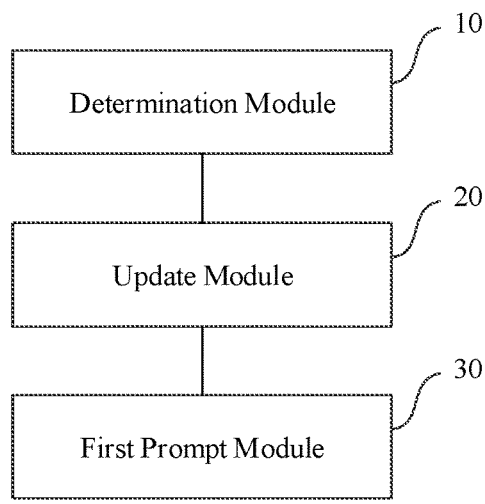
FIG. 9 is a schematic diagram illustrating a device for presenting push notifications according to an exemplary embodiment.

In another exemplary embodiment of the present disclosure, based on FIG. 8, as shown in FIG. 9, the device may further include a first prompt module 30 configured to present a prompt in a preset manner when the push time of the target push notification in the notification bar has been updated more than a preset number of times.

Figure 10:
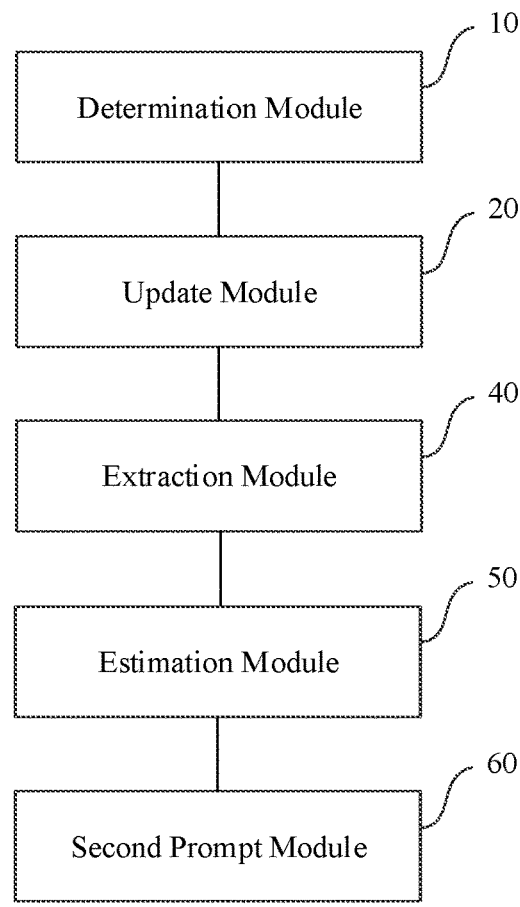
FIG. 10 is a schematic diagram illustrating a device for presenting push notifications according to an exemplary embodiment.

In another exemplary embodiment of the present disclosure, based on FIG. 8, as shown in FIG. 10, the device may further include an extraction module 40, an estimation module 50 and a second prompt module 60.

The extraction module 40 is configured to extract characteristic information of message content of the push notification. The characteristic information may be key words of the push notification, such as alarm, urgent, attention and other sensitive words.

The estimation module 50 is configured to estimate level of importance for the push notification based on the characteristic information extracted by the extraction module 40.

The second prompt module 60 is configured to present a prompt in a preset manner when the estimation module 50 estimates that the level of importance is greater than or equal to a preset level.

Figure 11:
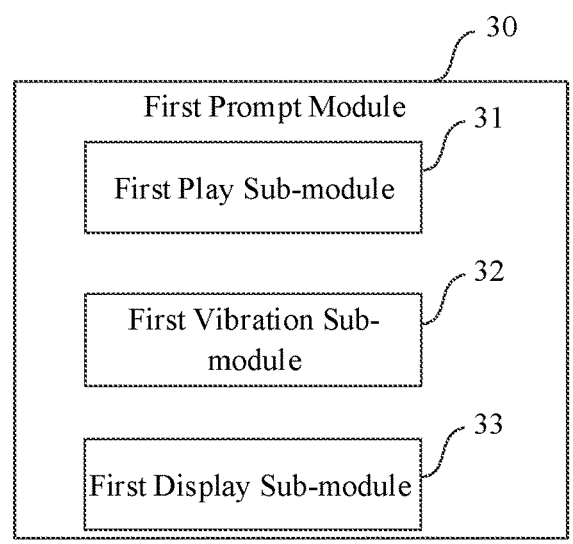
FIG. 11 is a schematic diagram of the first prompt module of FIG. 9.

In another exemplary embodiment of the present disclosure, based on FIG. 9, as shown in FIG. 11, the first prompt module 30 may include a first play sub-module 31, a first vibration sub-module 32 or a first display sub-module 33. The first play sub-module 31 is configured to play preset audio by a speaker of the terminal device. The first vibration sub-module 32 is configured to generate vibration by the terminal device. The first display sub-module 33 is configured to display a pop-up box on a main interface.

Figure 12:
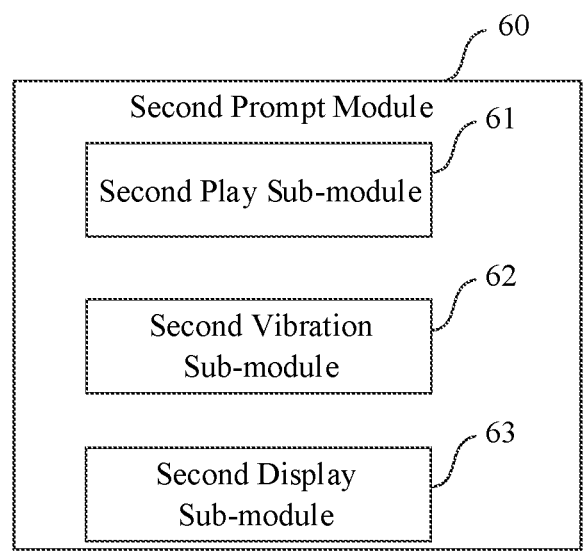
FIG. 12 is a schematic diagram of the second prompt module of FIG. 10.

In another exemplary embodiment of the present disclosure, based on FIG. 10, as shown in FIG. 12, the second prompt module 60 may include a second play sub-module 61, a second vibration sub-module 62 or a second display sub-module 63. The second play sub-module 61 is configured to play preset audio by a speaker of the terminal device. The second vibration sub-module 62 is configured to generate vibration by the terminal device. The second display sub-module 63 is configured to display a pop-up box on a main interface.

Figure 13:
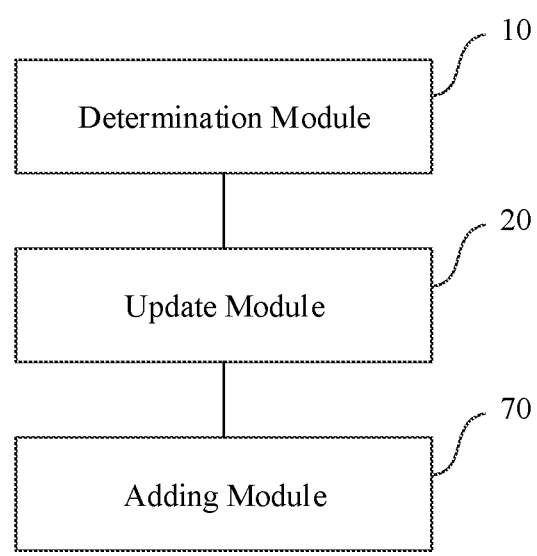
FIG. 13 is a schematic diagram illustrating a device for presenting push notifications according to an exemplary embodiment.

In another exemplary embodiment of the present disclosure, based on FIG. 8, as shown in FIG. 13, the device may further include an adding module 70 which is configured to add the message content of the push notification and the push time of the push notification to the notification bar when the target push notification is not in the notification bar.

Moreover, the target push notification determined by the determination module 10 and the push notification may correspond to the same application program.

Figure 14:
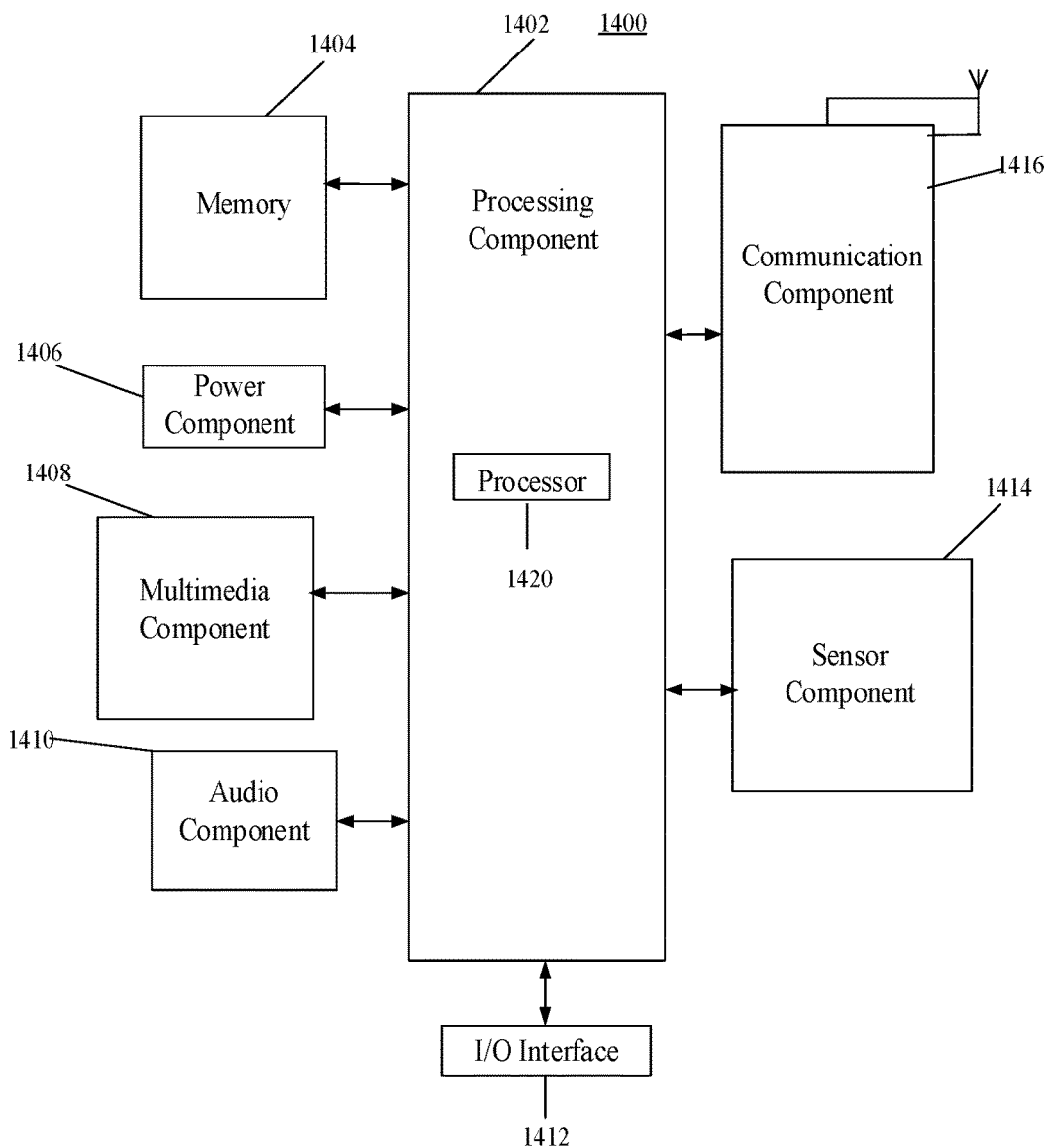
FIG. 14 is a structure diagram illustrating a terminal device for presenting push notifications according to an exemplary embodiment.

FIG. 14 is a structure diagram of a terminal device 1400 for information processing according to an exemplary embodiment. For example, the terminal device 1400 may be a mobile phone, a computer, a digital broadcast terminal, a messaging device, a gaming console, a tablet, a medical device, exercise equipment, a personal digital assistant, and the like.

Referring to FIG. 14, the terminal device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the terminal device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the terminal device 1400. Examples of such data include instructions for any applications or methods operated on the terminal device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the terminal device 1400. The power component 1406 may include a power management system, one or more power sources, and any other components associated with the generation, management, and distribution of power for the terminal device 1400.

The multimedia component 1408 includes a screen providing an output interface between the terminal device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the terminal device 1400 is in an operation mode, such as a photographing mode or a video mode. Each of the front camera and the rear camera may be a fixed optical lens system or have optical focusing and zooming capability.

The audio component 1410 is configured to output and/or input audio signals. For example, the audio component 1410 includes a microphone ("MIC") configured to receive an external audio signal when the terminal device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, the peripheral interface modules being, for example, a keyboard, a click wheel, buttons, and the like. The buttons may include, but are not limited to, a home button, a volume button, a starting button, and a locking button.

The sensor component 1414 includes one or more sensors to provide status assessments of various aspects of the terminal device 1400. For instance, the sensor component 1414 may detect an open/closed status of the terminal device 1400, relative positioning of components (e.g., the display and the keypad, of the terminal device 1400), a change in position of the terminal device 1400 or a component of the terminal device 1400, a presence or absence of user contact with the terminal device 1400, an orientation or an acceleration/deceleration of the terminal device 1400, and a change in temperature of the terminal device 1400. The sensor component 1414 may include a proximity sensor configured to detect the presence of a nearby object without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the terminal device 1400 and other devices. The terminal device 1400 can access a wireless network based on a communication standard, such as WiFi, 2G, or 3G, or a combination thereof. In an exemplary embodiment, the communication component 1416 receives a broadcast signal or broadcast associated information from an external broadcast management system via a broadcast channel. In an exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1404, executable by the processor 1420 in the terminal device 1400, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium having stored therein instructions that, when executed by a processor of a terminal device, cause the terminal device to perform the above described methods.

It should be understood that the present disclosure may be applied to many general or dedicated purpose computer system environments or configurations. For example, personal computer (PC), server computer, handheld device or portable device, tablet device, microprocessor-based system, set top box, programmable consume electronics, network PC, small-size computer, mainframe computer, distributed computing environment including any of the above systems or devices, and the like.

The disclosure may be described in general context of computer-executable instructions executed by a computer, for example, a program module. Generally, the program module may include routine, program, object, component, data structure and the like that performs particular tasks or implements particular abstract data type. The disclosure may be implemented in distributed computing environment where tasks are performed by a remote device connected via a communication network. In the distributed computing environment, the program module may be located in local or remote computer storage media including a storage device.

It should be noted that the relationship terms such as "the first" and "the second" are intended to separate an entity or operation from another in the present application, and not necessarily to require or imply that there is any actual relationship or order among these entities or operations. It is intended that terms "include", "comprise" and other variations thereof are non-exclusive, such that a procedure, method, item or device including a series of elements not only include these elements, but also other elements that have not been listed, or all fixed elements of the procedure, method, item or device are included. Without more limitation, the elements defined by "comprise a/an" will not exclude other elements existed in the procedure, method, item or device including the elements.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for presenting push notifications in a terminal device configured with a notification bar, comprising:
   determining, when a push notification is received, whether a target push notification having the same content as that of the currently received push notification has been in the notification bar;
   updating a push time of the target push notification to the push time of the currently received push notification in response to determining that the target push notification has been in the notification bar;
   presenting the updated push time of the target push notification in the notification bar; and
   performing a prompt in a preset manner, only in response to either of the group consisting of:
      that the push time of the target push notification has been updated more than a preset number of times, and
      that characteristic information extracted out of message content of the currently received push notification indicates a level of importance for the currently received push notification greater than or equal to a preset level; and
   wherein performing the prompt in the preset manner comprises at least one of the group consisting of:
      playing a preset audio by a speaker of the terminal device,
      generating a vibration by the terminal device, and
      displaying a pop-up box on a main interface of the terminal device.

2. The method of claim 1, wherein the method further comprises:
   adding the message content of the currently received push notification and the push time of the currently received push notification to the notification bar when there is no target push notification in the notification bar.

3. The method of claim 1, wherein the target push notification and the currently received push notification are pushed by a same application program installed in the terminal device.

4. A terminal device for presenting push notifications, comprising:
   a processor;
   a memory for storing processor-executable instructions;
   wherein the processor is configured to:
      determine, when a push notification is received, whether a target push notification having the content as that of the currently received push notification has been in a notification bar of the terminal device;
      update a push time of the target push notification to the push time of the currently received push notification in response to determining that the target push notification has been in the notification bar;
      present the updated push time of the target push notification in the notification bar; and
      perform a prompt in a preset manner, only in response to either of the group consisting of:
         that the push time of the target push notification has been updated more than a preset number of times, and
         that characteristic information extracted out of message content of the currently received push notification indicates a level of importance for the currently received push notification greater than or equal to a preset level; and
      wherein to perform the prompt in the preset manner comprises at least one of the group consisting of:
         to play a preset audio by a speaker of the terminal device,
         to generate a vibration by the terminal device, and
         to display a pop-up box on a main interface of the terminal device.

5. The terminal device of claim 4, wherein the processor is further configured to:
   add the message content of the currently received push notification and the push time of the currently received push notification to the notification bar when there is no target push notification in the notification bar.

6. The terminal device of claim 4, wherein the target push notification and the currently received push notification are pushed by a same application program installed in the terminal device.

7. A non-transitory computer readable storage medium having stored therein instructions that, when executed by a processor of a terminal device configured with a notification bar, cause the terminal device to:
   determine, when a push notification is received, whether a target push notification having the same content as that of the currently received push notification has been in the notification bar;
   update a push time of the target push notification to the push time of the currently received push notification in response to determining that the target push notification has been in the notification bar;
   present the updated push time of the target push notification in the notification bar; and
   perform a prompt in a preset manner, only in response to either of the group consisting of:
      that the push time of the target push notification has been updated more than a preset number of times, and
      that characteristic information extracted out of message content of the currently received push notification indicates a level of importance for the currently received push notification greater than or equal to a preset level; and
   wherein to perform the prompt in the preset manner comprises at least one of the group consisting of:
      to play a preset audio by a speaker of the terminal device,
      to generate a vibration by the terminal device, and
      to display a pop-up box on a main interface of the terminal device.

8. The method of claim 1, wherein the push notification is received from a smart device bound to the terminal device.

9. The method of claim 1, wherein the push notification indicates an operating state of the smart device.

10. The method of claim 1, wherein the push notification includes a device identification of the smart device, an information type of the push notification, and a time of receiving the push notification.

11. The terminal device of claim 4, wherein the push notification is received from a smart device bound to the terminal device.

12. The terminal device of claim 4, wherein the push notification indicates an operating state of the smart device.

13. The terminal device of claim 4, wherein the push notification includes a device identification of the smart device, an information type of the push notification, and a time of receiving the push notification.

* * * * *